US012246464B2

(12) United States Patent
Ebert et al.

(10) Patent No.: US 12,246,464 B2
(45) Date of Patent: Mar. 11, 2025

(54) FOLDING KNIFE WITH SELECTIVELY HIDDEN BLADE RELEASE

(71) Applicant: Stanley Black & Decker, Inc., New Britain, CT (US)

(72) Inventors: Kara Nicole Ebert, Cincinnati, OH (US); Ralf Strauss, Stanley, NC (US); Gregory David Parker, Charlotte, NC (US)

(73) Assignee: STANLEY BLACK & DECKER, INC., New Britain, CT (US)

( * ) Notice: Subject to any disclaimer, the term of this patent is extended or adjusted under 35 U.S.C. 154(b) by 304 days.

(21) Appl. No.: 17/550,557

(22) Filed: Dec. 14, 2021

(65) Prior Publication Data

US 2022/0184825 A1 Jun. 16, 2022

Related U.S. Application Data

(60) Provisional application No. 63/125,953, filed on Dec. 15, 2020.

(51) Int. Cl.
*B26B 5/00* (2006.01)
*B25G 1/08* (2006.01)

(52) U.S. Cl.
CPC . *B26B 5/00* (2013.01); *B25G 1/08* (2013.01)

(58) Field of Classification Search
None
See application file for complete search history.

(56) References Cited

U.S. PATENT DOCUMENTS 3,845,554 A 11/1974 Joanis et al.
6,354,007 B1 3/2002 Scarla
6,915,577 B2 * 7/2005 Scala ...................... B26B 1/044 30/330

(Continued)

FOREIGN PATENT DOCUMENTS

EP 2489483 A1 8/2012
EP 2835235 A1 2/2015
EP 3412415 A2 12/2018

OTHER PUBLICATIONS

Communication pursuant to Article 94(3) EPC issued in EP 21214192.3 dated Nov. 8, 2023, 4 pages.

(Continued)

*Primary Examiner* — Hwei-Siu C Payer
(74) *Attorney, Agent, or Firm* — Eversheds Sutherland (US) LLP

(57) ABSTRACT

Certain embodiments of a folding knife are disclosed. In one embodiment, an example knife may include a handle and a blade carrier. The blade carrier may be rotatable about the handle and may include a left and a right cap. A blade may be removably disposed within the blade carrier. The knife may further include a blade release mechanism. In one embodiment, the blade release mechanism may include a compression spring and a lift bar. In another embodiment, the blade release mechanism may further include a wheel. In yet another embodiment, the blade release mechanism may include a leaf spring and a slide bar. When the blade carrier is rotated such that the knife is not in a cutting position, at least a portion of the blade release mechanism is exposed. When the blade release mechanism is activated, the blade may be removed from within the blade carrier.

15 Claims, 11 Drawing Sheets

(56) References Cited

U.S. PATENT DOCUMENTS

| | | | | |
|---|---|---|---|---|
| 6,968,622 | B2 | 11/2005 | Ping | |
| 7,814,664 | B2 * | 10/2010 | LeBlanc | B26B 1/042 30/330 |
| 10,144,139 | B2 * | 12/2018 | Squiers | B26B 5/00 |
| 2008/0289191 | A1 | 11/2008 | LeBlanc et al. | |
| 2010/0263214 | A1 * | 10/2010 | Robinson | B26B 1/02 30/337 |
| 2012/0260505 | A1 * | 10/2012 | Qiu | B26B 5/00 30/165 |
| 2013/0255087 | A1 * | 10/2013 | Wang | B26B 5/00 30/162 |
| 2021/0354318 | A1 * | 11/2021 | Scimone | B26B 1/04 |
| 2022/0184825 | A1 * | 6/2022 | Ebert | B25G 1/08 |

OTHER PUBLICATIONS

DeWalt (Stanley) folding retractable utility knife 2324739, webpage: https://www.dewalt.com/product/dwht10035/ folding-retractable-utility-knife.

Kobalt six blade folding utility knife 53292; webpage: https://www.lowes.com/pd/Kobalt-3-0-in-Razor-Safe-Folding- Utility-Knife/5001954767.

Milwaukee folding utility knife 48-22-1901, webpage: https://www.milwaukeetool.com/products/48-22-1901.

* cited by examiner (Conitinued)

FOLDING KNIFE WITH SELECTIVELY HIDDEN BLADE RELEASE

RELATED APPLICATION

The present application claims priority to U.S. Ser. No. 63/125,963, filed Dec. 15, 2020, the contents of which are incorporated by reference.

FIELD OF THE DISCLOSURE

This disclosure relates to folding knives that can selectively expose or protect a cutting edge of a replaceable blade.

BACKGROUND

Certain conventional folding knifes configured with removable blades can include a blade release mechanism that allows the blade to be removed only when the blade carrier is positioned at a specific predetermined (for example, 45 degrees) angle from the top of the handle. However, such blade release mechanisms render it impossible for the user to engage the blade release mechanism while the knife is in the cutting position. Without an indication to a user that the user must position the blade carrier at the specific predetermined angle from the top of the handle before attempting to release the blade, a user might mistakenly believe that the blade release mechanism is broken when he/she is unable to engage the blade release mechanism when the utility knife is in the cutting position.

SUMMARY

Various aspects of embodiments of the disclosure are provided herein, as well as certain associated methods of operation and functions of the related elements of structure and the combination of parts and economies of manufacture, will become more apparent upon consideration of the following description with reference to the accompanying drawings, all of which form a part of this specification, wherein like reference numerals designate corresponding parts in the various figures. In one embodiment of the disclosure, the structural components illustrated herein are drawn to scale. It is to be expressly understood, however, that the drawings are for the purpose of illustration and description only and are not intended as a definition of the limits of the disclosure, and that other scales and proportions are also contemplated and covered by this application. In addition, it should be appreciated that structural features shown or described in any one embodiment herein can be used in other embodiments as well. As used in the specification, the singular form of "a", "an", and "the" include plural referents unless the context clearly dictates otherwise.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Disclosed herein are folding knives that can selectively expose or protect a cutting edge of a replaceable blade. Further, certain embodiments of the disclosure can include folding knives that can intrinsically communicate to a user a specified position for the blade carrier relative to the handle in order to permit a blade change operation. It may be appreciated that other aspects of certain embodiments of the disclosure may include preventing inadvertent access to the blade change actuator when the knife is in the cutting position. Further, in order to make the blade release mechanism more intuitive to users, in one embodiment, the blade release mechanism may be impossible to actuate while the knife is in the cutting position, and the blade release mechanism may be entirely inaccessible while the knife is in the cutting position. More specifically, the button to release the blade may be at least partially hidden while the knife is in the cutting position. Only as the blade carrier is positioned at a certain angle from the knife handle is the button of the blade release mechanism made visible and accessible.

Figure 1:
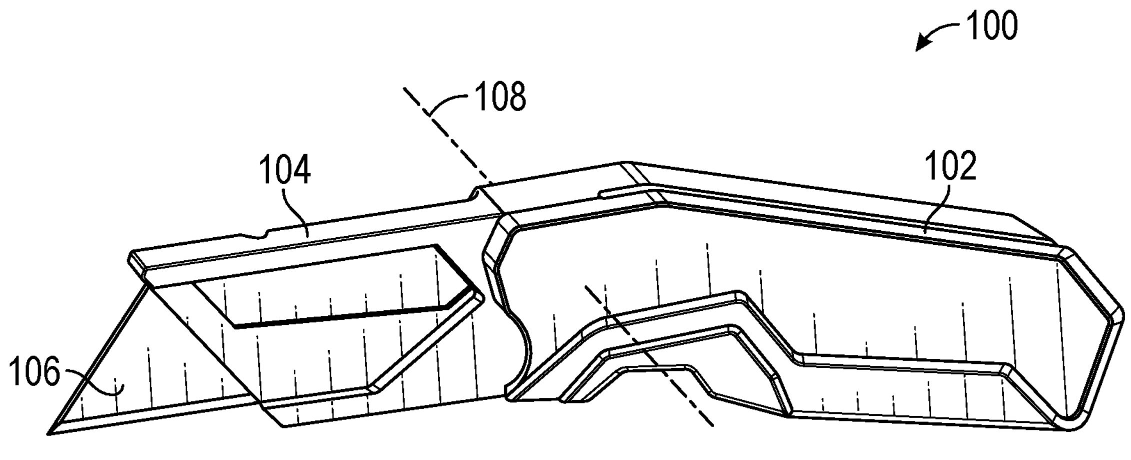
FIG. 1 depicts a side view of an example folding knife in accordance with one or more embodiments of the disclosure.

FIG. 1 depicts a side view of an example folding knife 100 in accordance with one or more example embodiments of the disclosure. The folding knife 100 may include a handle 102, a blade carrier 104, and a blade 106. As depicted in FIG. 1, the blade carrier 104 may be configured to be mounted to the handle 102. The blade carrier 104 may be configured to receive the blade 106. In one embodiment, the handle 102 may include a slot for receiving the blade carrier 104. The handle 102 and the blade carrier 104 may be made of a rigid material. As depicted in FIG. 1, the blade carrier 104 may be configured to rotate about an axis 108 such that the blade 106 may rotate parallel to the handle 102. Further, the axis 108 may be located where the blade carrier 104 is mounted to the handle 102.

Figure 2:
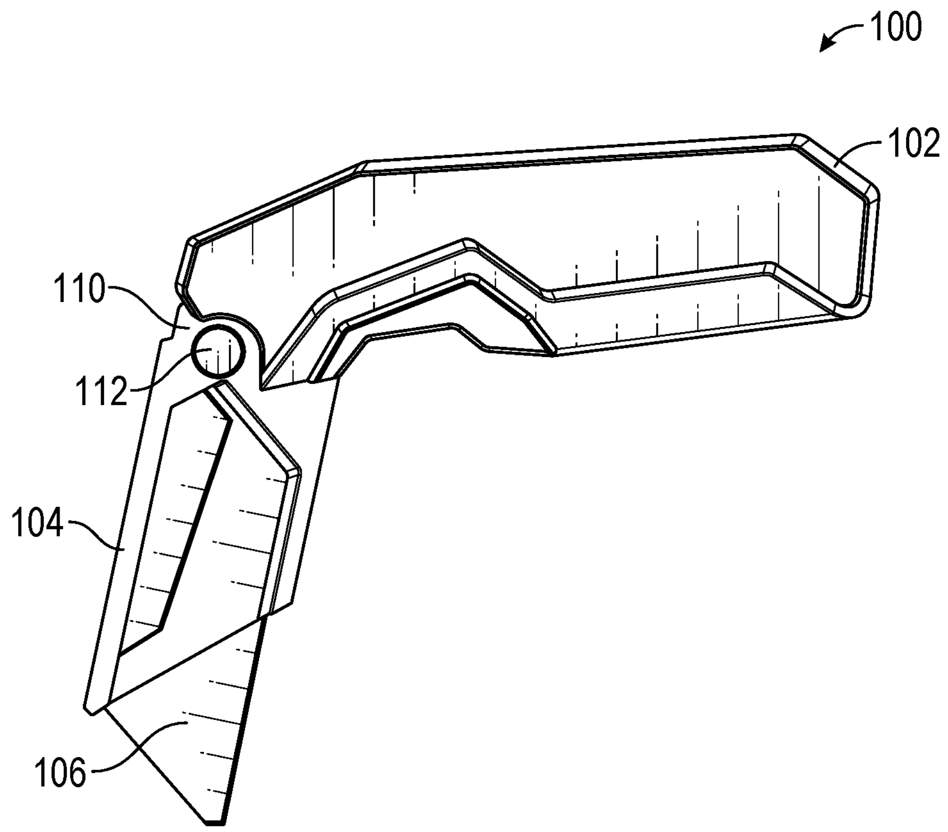
FIG. 2 depicts a side view of the example folding knife of FIG. 1 in accordance with one or more embodiments of the disclosure.

FIG. 2 depicts a side view of the example folding knife 100 of FIG. 1 in accordance with one or more example embodiments of the disclosure. As depicted in FIG. 2, the folding knife 100 may be configured such that the blade carrier 104 is able to rotate until it reaches a specific predetermined angle from the handle 102. In some embodiments, the specific predetermined angle may be 45 degrees. In some embodiments, when the blade carrier 104 is rotated by the specific predetermined angle, the folding knife 100 may be in a blade release position. As depicted in FIG. 2, a blade release mechanism 110, which may be built into the blade carrier 104, may become exposed to a user when the blade carrier 104 is in the blade release position. In some embodiments, as depicted in FIG. 2, the blade release mechanism 110 may include an actuator 112, for example, a button. In some embodiments, as depicted in FIG. 2, the actuator 112 may be entirely exposed when the blade carrier 104 is in the blade release position. In other embodiments, the actuator 112 may be partially exposed when the blade carrier 104 is in the blade release position. Thus, in some embodiments, the actuator 112 may be partially obscured from view when the folding knife 100 is not in the blade release position.

Figure 3:
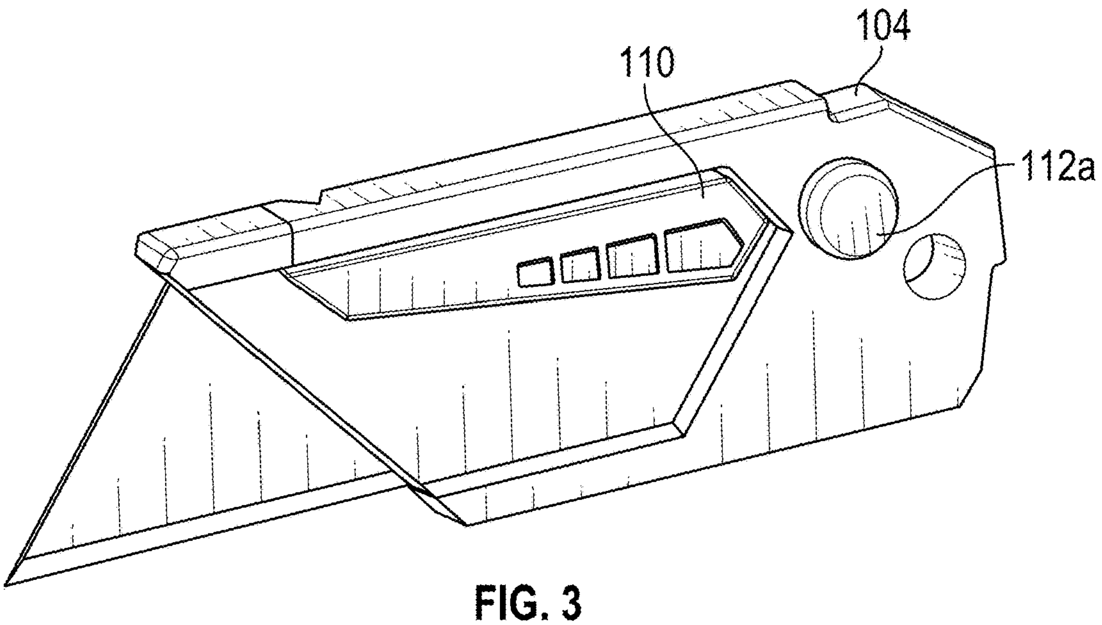
FIG. 3 depicts a side view of an example blade carrier of the example folding knife of FIG. 1 in accordance with one or more embodiments of the disclosure.

FIG. 3 depicts a side view of a blade carrier 104 of the example folding knife 100 in accordance with one or more example embodiments of the disclosure. Blade carrier 104 may include blade release mechanism 110 having an actuator 112*a*. In one embodiment, the actuator 112*a* may be a button.

Figure 4:
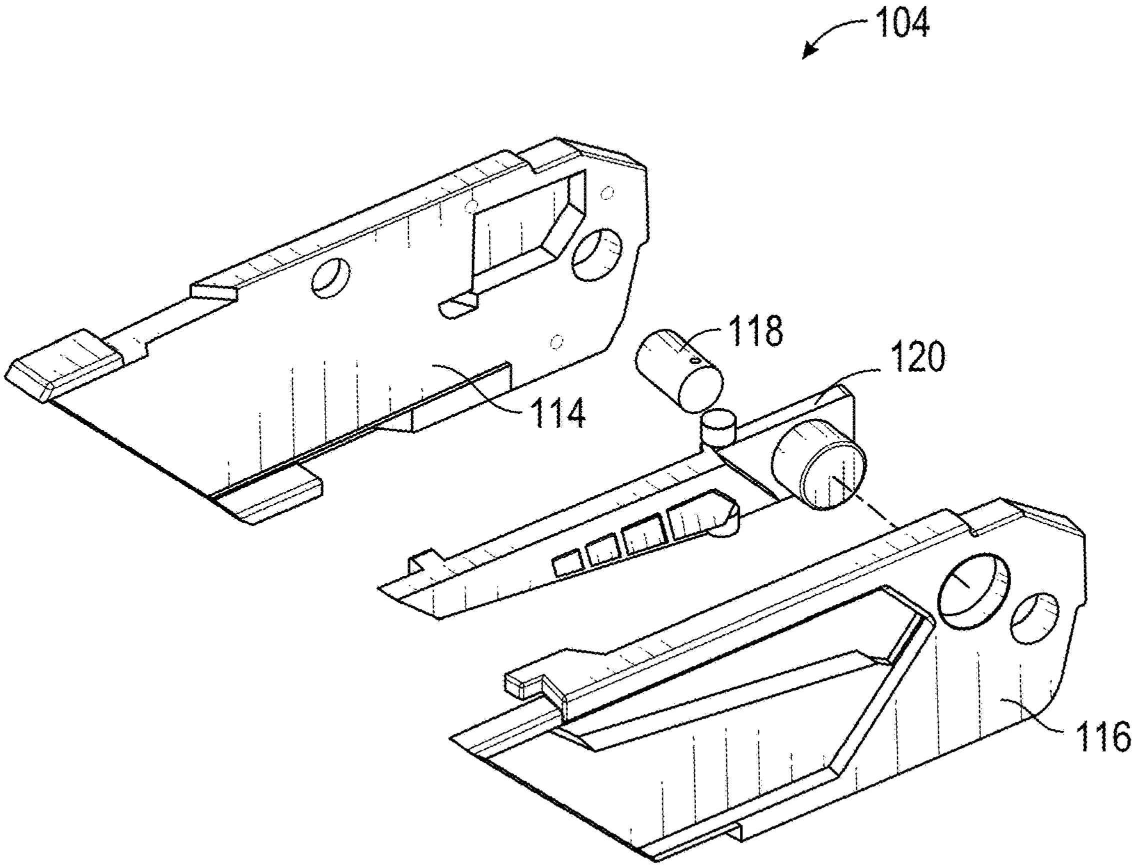
FIG. 4 depicts an exploded view of the example blade carrier of FIG. 3 in accordance with one or more embodiments of the disclosure.

FIG. 4 depicts an exploded view of the blade carrier 104 of the example folding knife 100 in accordance with one or more example embodiments of the disclosure. The blade carrier 104 may be made of multiple components mounted to each other. In one embodiment, the blade carrier 104 may include a left cap 114, a right cap 116, a compression spring 118, and a lift bar 120. The left cap 114 and the right cap 116 may fit together to contain the blade 106. The left cap 114 and the right cap 116 may be mounted together by means of the compression spring 118 and the lift bar 120, both of which may be mounted to either of the left cap 114 or the right cap 116. The compression spring 118 and the lift bar 120 may rest inside of the left cap 114 and the right cap 116. In other embodiments, functional equivalents to the left cap 114, the right cap 116, the compression spring 118, and the lift bar 120 may likewise be understood as being utilized in various alternative embodiments.

In some embodiments, the lift bar 120 may include an extruded piece of material to hold the blade 106 in place, a cylindrical peg that acts as a pivot point, and an extruded button feature, for example, button 112*a* depicted in FIG. 3. In some embodiments, the compression spring 118 may sit partially inside of a hollow button, for example, button 112*a* depicted in FIG. 3, and partially in a pocket of either the left cap 114 or the right cap 116.

Figure 5:
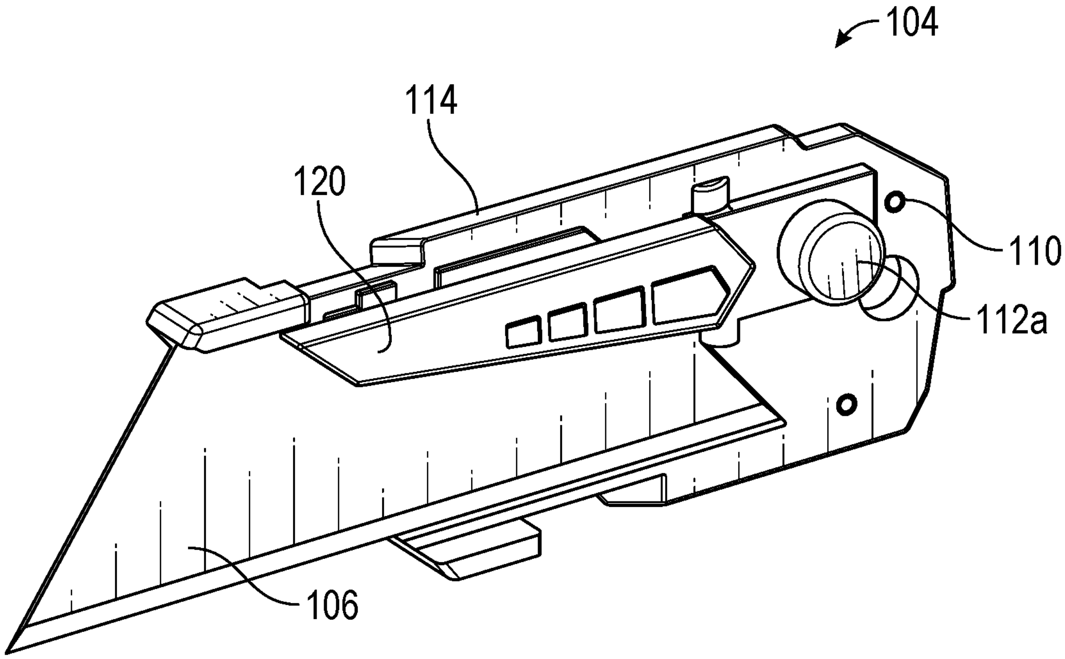
FIG. 5 depicts a side view of the example blade carrier of FIG. 3 in accordance with one or more embodiments of the disclosure.

FIG. 5 depicts a side view of the blade carrier 104 in accordance with one or more example embodiments of the disclosure. As depicted in FIG. 5, the blade release mechanism 110 may be used to release the blade 106. As a user presses down on the button 112*a*, the button 112*a* moves inwards and towards the left cap 114 and the right cap 116. This causes a first end of the lift bar 120 to move towards the left cap 114 and the right cap 116. The lift bar 120 then rotates about the cylindrical peg that acts as a pivot point—and a second distal end of the lift bar 120 is forced outwards and away from the left cap 114 and the right cap 116. The second distal end of the lift bar 120 may thus move in a direction opposite to the direction in which the user pushed the button 112*a*. As this motion occurs, the lift bar 120 disengages from the blade 106, thus enabling a user to remove the blade 106 from the blade carrier 104.

Figure 6:
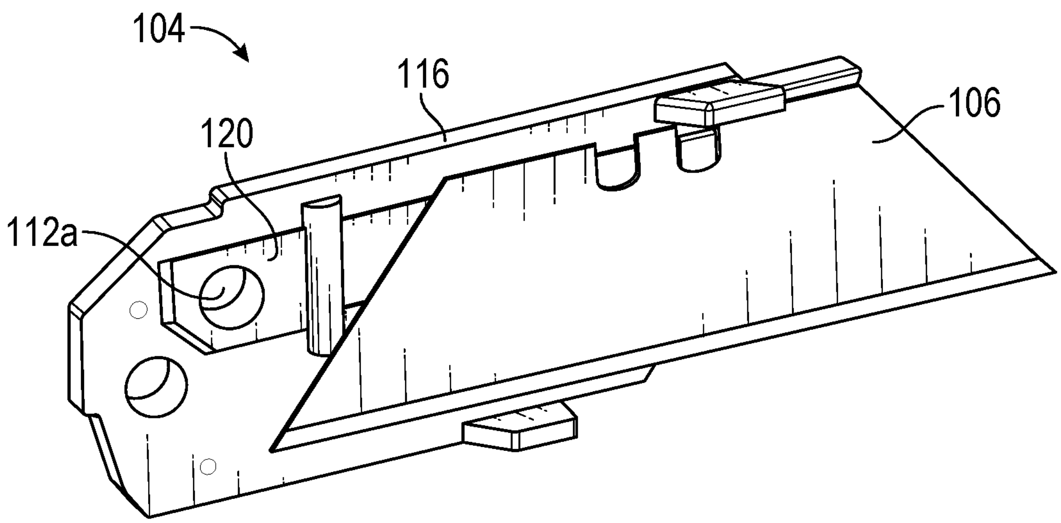
FIG. 6 depicts a side view of the example blade carrier of FIG. 3 in accordance with one or more embodiments of the disclosure.

FIG. 6 depicts a side view of blade carrier 104 in accordance with one or more example embodiments of the disclosure. As depicted in FIG. 6, the blade release mechanism 110 may be used to re-engage the blade 106. As a user releases all contact with the button 112*a* and the lift bar 120, the compression spring 118, which may be partially sitting inside a hollow of button 112*a* and extending towards a wall of the left cap 114 or the right cap 116, may no longer be in compression and may expand. This expansion of the compression spring 118 forces a first end of the lift bar 120 to move away from the left cap 114 and the right cap 116. The lift bar 120 then rotates about the cylindrical peg that acts as a pivot point, and a second distal end of the lift bar 120 is forced inwards and towards the left cap 114 and the right cap 116, until the lift bar 120 is in contact with both the left cap 114 and the right cap 116. At this point, if the blade 106 is disposed within the blade carrier 104, the blade 106 will be secured by the compression spring 118 acting on the lift bar 120 to force the left cap 114 and the right cap 116 towards each other.

In various embodiments, the left cap 114, the right cap 116, and the lift bar 120 may be formed from cast aluminum or zinc or powdered metal stainless components. In some embodiments, the lift bar 120 may be made of stainless steel sheet metal or an engineering plastic such as ABS, polypropylene, or any other strong and/or durable grade of plastic. In some embodiments, the compression spring 118 may be made of either stainless steel or a plated music wire grade of steel.

Figure 7:
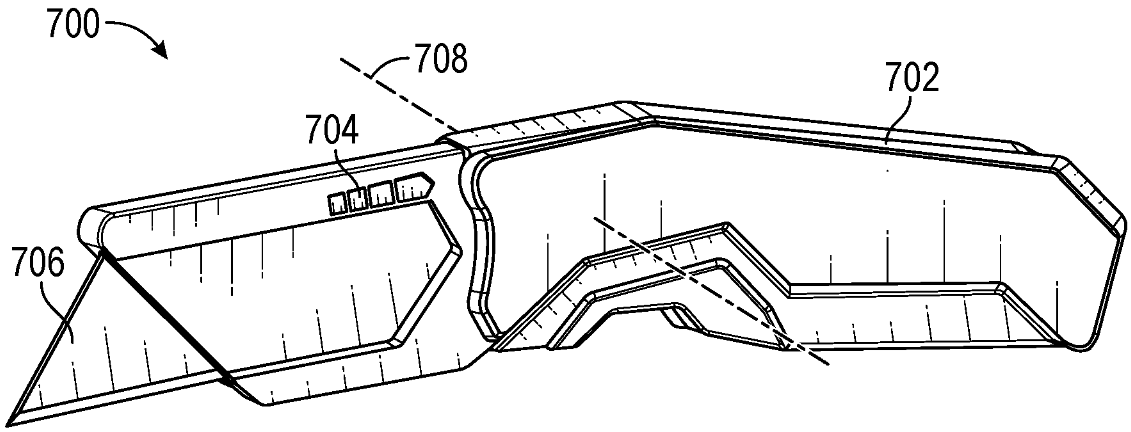
FIG. 7 depicts a side view of an example folding knife in accordance with one or more embodiments of the disclosure.

FIG. 7 depicts a side view of an example folding knife 700 in accordance with one or more example embodiments of the disclosure. The folding knife 700 may include a handle 702, a blade carrier 704, and a blade 706. As depicted in FIG. 7, the blade carrier 704 may be configured to be mounted to the handle 702. The blade carrier 704 may be configured to receive the blade 706. In one embodiment, the handle 702 may include a slot for receiving the blade carrier 704. The handle 702 and the blade carrier 704 may be made of a rigid material. As depicted in FIG. 7, the blade carrier 704 may be configured to rotate about an axis 708 such that the blade 706 may rotate parallel to the handle 702. Further, the axis 708 may be located where the blade carrier 704 is mounted to the handle 702.

Figure 8:
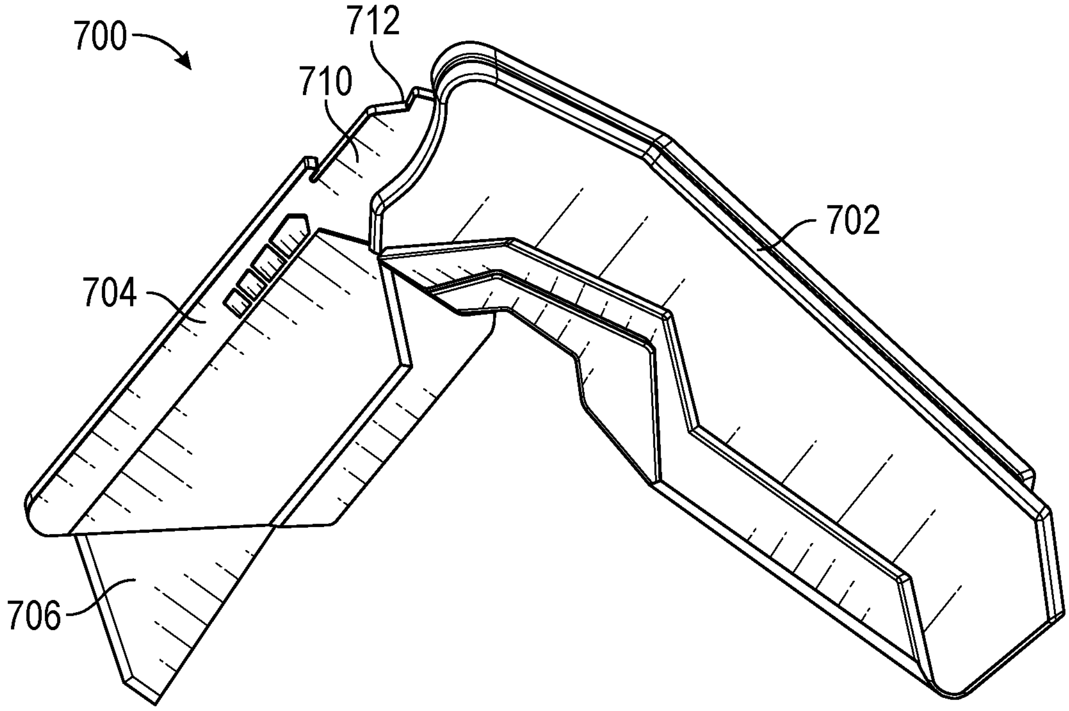
FIG. 8 depicts a side view of the example folding knife of FIG. 7 in accordance with one or more embodiments of the disclosure.

FIG. 8 depicts a side view of the example folding knife 700 of FIG. 7 in accordance with one or more example embodiments of the disclosure. As depicted in FIG. 7, the folding knife 700 may be configured such that the blade carrier 704 is able to rotate until it reaches a specific predetermined angle from the handle 702. In some embodiments, the specific predetermined angle may be 45 degrees. In some embodiments, when the blade carrier 704 is rotated by the specific predetermined angle, the folding knife 700 may be in a blade release position. As depicted in FIG. 8, a blade release mechanism 710, which may be built into the blade carrier 704, may become exposed to a user when the blade carrier 704 is in the blade release position. In some embodiments, as depicted in FIG. 8, the blade release mechanism 710 may include an actuator 712, for example, a slide bar 720. In some embodiments, as depicted in FIG. 8, a portion of the actuator 712 may be entirely exposed when the blade carrier 704 is in the blade release position. In other embodiments, a portion of the actuator 712 may be partially exposed when the blade carrier 704 is in the blade release position.

Figure 9:
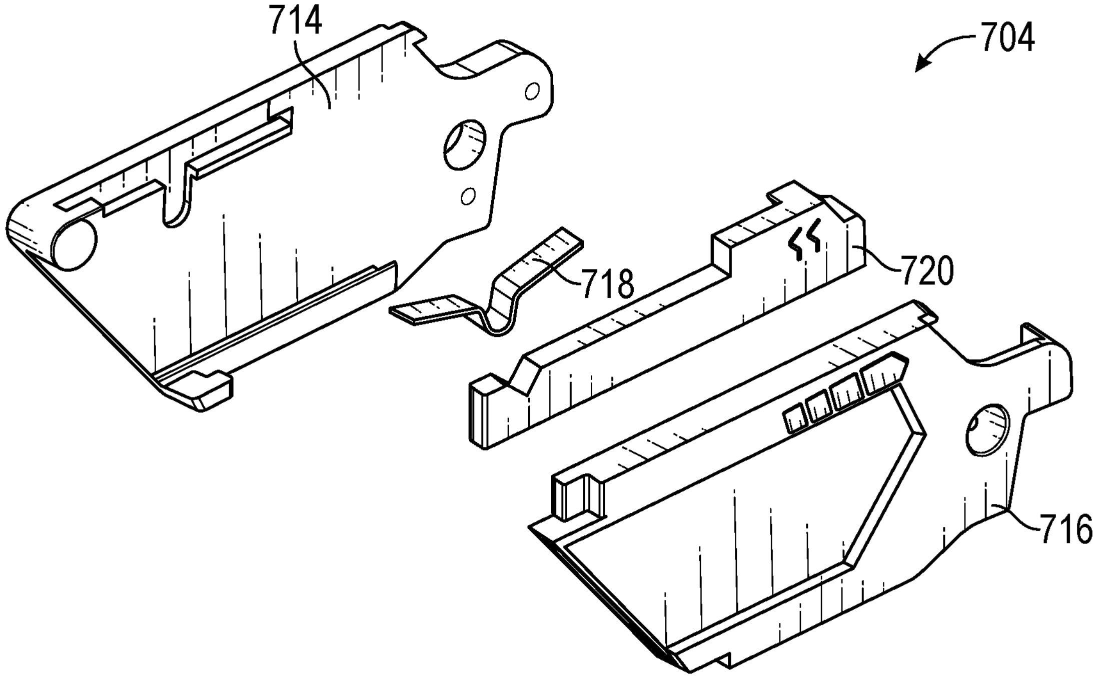
FIG. 9 depicts an exploded view of an example blade carrier of the example folding knife of FIG. 7 in accordance with one or more embodiments of the disclosure.

FIG. 9 depicts an exploded view of the blade carrier 704 of the example folding knife 700 in accordance with one or more example embodiments of the disclosure. The blade carrier 704 may be made of multiple components mounted to each other. In one embodiment, the blade carrier 704 may include a left cap 714, a right cap 716, a leaf spring 718, and the slide bar 720. The left cap 714 and the right cap 716 may fit together to contain the blade 706. The left cap 714 and the right cap 716 may be mounted together by means of the leaf spring 718 and the slide bar 720, both of which may be mounted to either of the left cap 714 or the right cap 716. The leaf spring 718 and the slide bar 720 may rest inside of the left cap 714 and the right cap 716. In other embodiments, functional equivalents to the left cap 714, the right cap 716, the leaf spring 718, and the slide bar 720 may likewise be understood as being utilized in various alternative embodiments.

In some embodiments, the slide bar 720 may include an extruded piece of material to assist the leaf spring 718 in holding the blade 706 in place. In some embodiments, the leaf spring 718 may be in contact with the slide bar 720, and the leaf spring 718 may sit partially in a pocket of either the left cap 714 or the right cap 716. In some embodiments, the leaf spring 718 is U-shaped. In some embodiments, the left cap 714 and the right cap 716 may include a cut-out area at a first end to facilitate the back button (not shown) being disposed proximate to the first end of the left cap 714 and the right cap 716.

Figure 10:
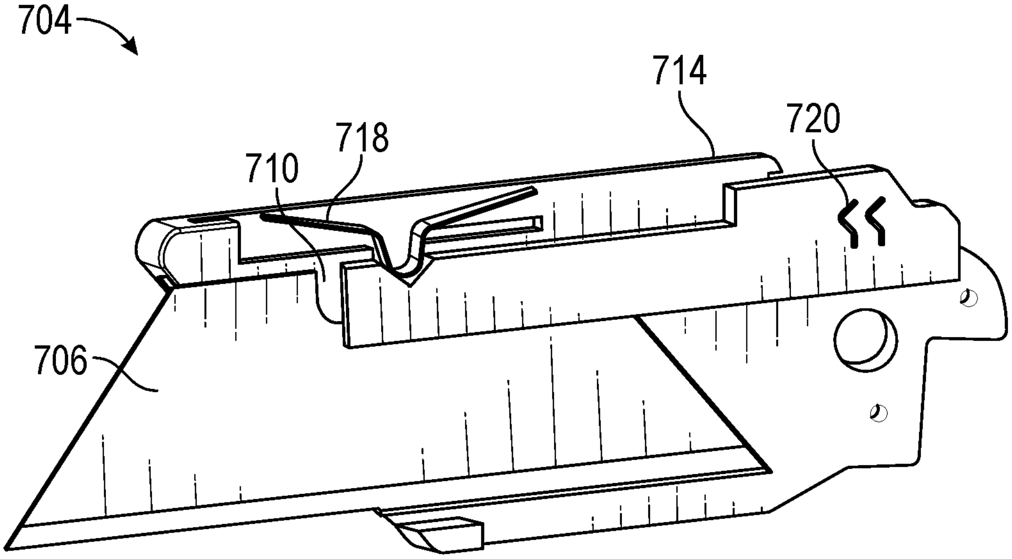
FIG. 10 depicts a side view of an example blade carrier of FIG. 9 in accordance with one or more embodiments of the disclosure.

FIG. 10 depicts a side view of the blade carrier 704 in accordance with one or more example embodiments of the disclosure. As depicted in FIG. 10, the blade release mechanism 710 may be used to release the blade 706. As a user pushes the slide bar 720 inwards towards the blade 706, the slide bar 720 moves inwards and towards the left cap 714 and the right cap 716. This causes a first end of the slide bar 720 to come into contact with the leaf spring 718. The leaf spring 718 may be used to hold the blade 706 in place within the blade carrier 704 until the leaf spring 718 is engaged by the slide bar 720. The leaf spring 718 may be forced upwards by a second distal end of the slide bar 720 as the slide bar 720 is pushed inwards, thus enabling the blade 706 to be removed from the blade carrier 704.

Although not depicted in FIG. 10, the blade release mechanism 710 may be further used to re-engage the blade 706. As a user releases all contact with the slide bar 720, the leaf spring 718 may no longer be in compression and may expand. This expansion of the leaf spring 718 forces the distal second end of the slide bar 720 to move outwards and away from the left cap 714 and the right cap 716. At this point, if the blade 706 is disposed within the blade carrier 704, the blade 706 will be secured by the leaf spring 718.

In various embodiments, the left cap 714, the right cap 716, and the slide bar 720 may be formed from cast aluminum or zinc or powdered metal stainless components. In some embodiments, the slide bar 720 may be made of stainless steel sheet metal or an engineering plastic such as ABS, polypropylene, or any other strong and/or durable grade of plastic. In some embodiments, the leaf spring 718 may be made of either stainless steel or a plated music wire grade of steel.

Figure 11:
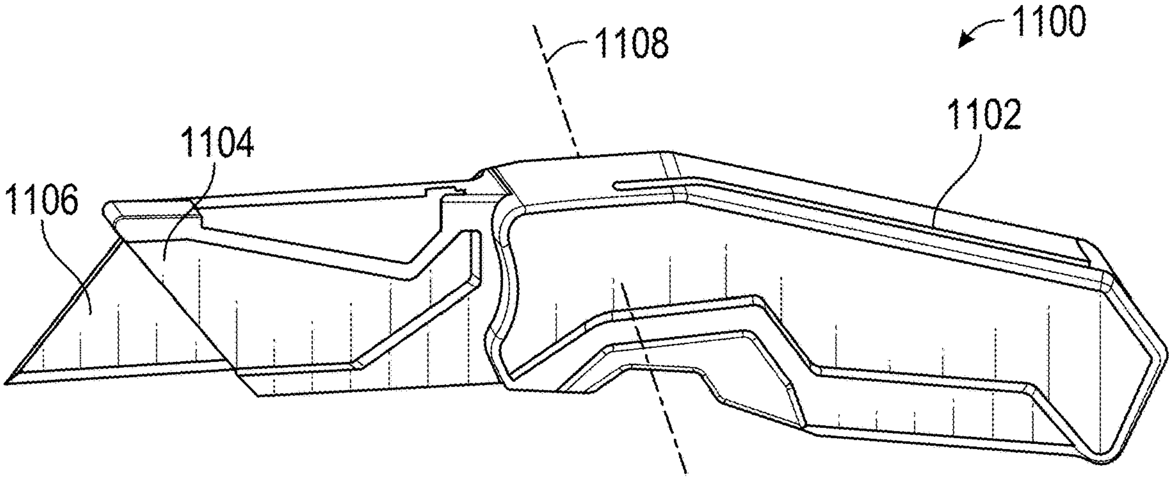
FIG. 11 depicts a side view of an example folding knife in accordance with one or more embodiments of the disclosure.

FIG. 11 depicts a side view of an example folding knife 1100 in accordance with one or more example embodiments of the disclosure. The folding knife 1100 may include a handle 1102, a blade carrier 1104, and a blade 1106. As depicted in FIG. 11, the blade carrier 1104 may be configured to be mounted to the handle 1102. The blade carrier 1104 may be configured to receive the blade 1106. In one embodiment, the handle 1102 may include a slot for receiving the blade carrier 1104. The handle 1102 and the blade carrier 1104 may be made of a rigid material. As depicted in FIG. 11, the blade carrier 1104 may be configured to rotate about an axis 1108 such that the blade 1106 may rotate parallel to the handle 1102. Further, the axis 1108 may be located where the blade carrier 1104 is mounted to the handle 1102.

Figure 12:
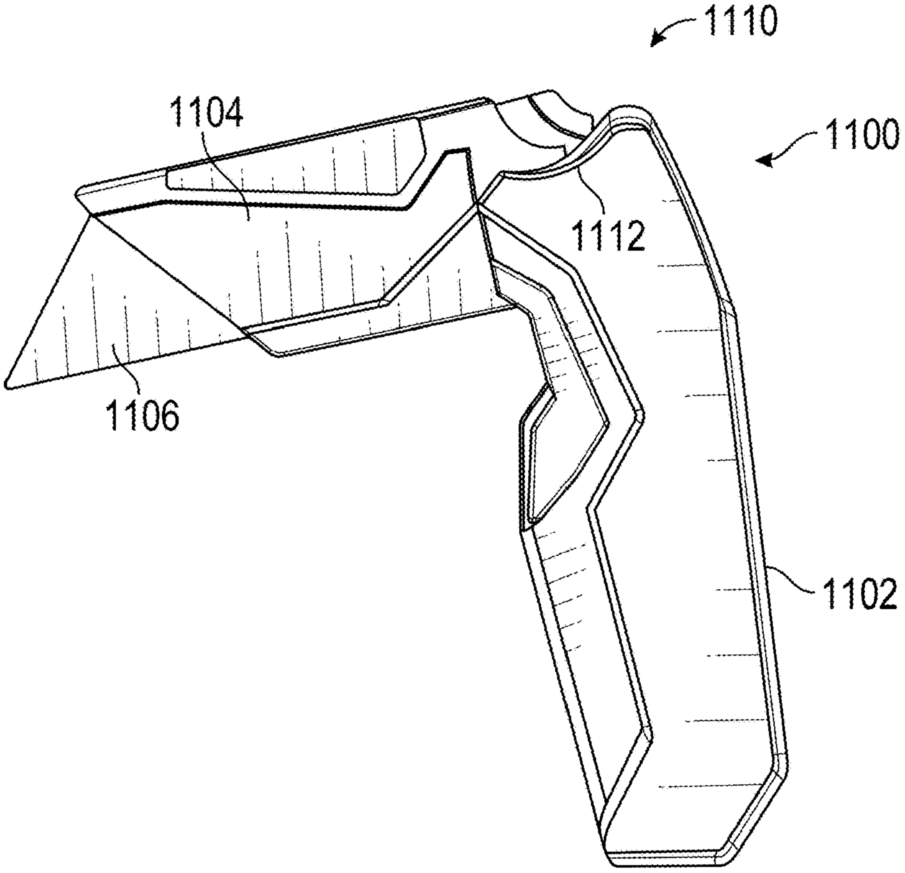
FIG. 12 depicts a side view of the example folding knife of FIG. 11 in accordance with one or more embodiments of the disclosure.

FIG. 12 depicts a side view of the example folding knife 1100 of FIG. 11 in accordance with one or more example embodiments of the disclosure. As depicted in FIG. 12, the folding knife 1100 may be configured such that the blade carrier 1104 is able to rotate until it reaches a specific predetermined angle from the handle 1102. In some embodiments, the specific predetermined angle may be 45 degrees. In some embodiments, when the blade carrier 1104 is rotated by the specific predetermined angle, the folding knife 1100 may be in a blade release position. As depicted in FIG. 12, a blade release mechanism 1110, which may be built into the blade carrier 1104, may become exposed to a user when the blade carrier 1104 is in the blade release position. In some embodiments, as depicted in FIG. 12, the blade release mechanism 1110 may include an actuator 1112, for example, a lift bar 1120. In some embodiments, as depicted in FIG. 12, the actuator 1112 may be entirely exposed when the blade carrier 1104 is in the blade release position. In other embodiments, the actuator 1112 may be partially exposed when the blade carrier 1104 is in the blade release position.

Figure 13:
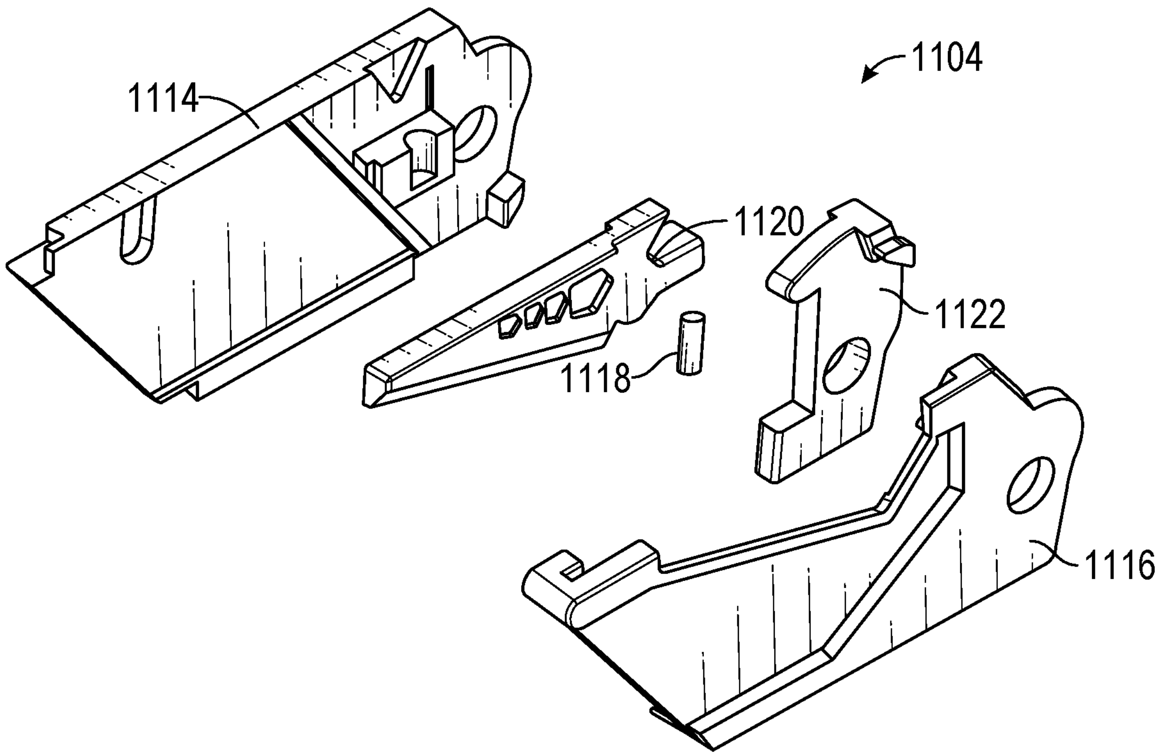
FIG. 13 depicts an exploded view of an example blade carrier of the example folding knife of FIG. 11 in accordance with one or more embodiments of the disclosure.

FIG. 13 depicts an exploded view of the blade carrier 1104 of the example folding knife 1100 in accordance with one or more example embodiments of the disclosure. The blade carrier 1104 may be made of multiple components mounted to each other. In one embodiment, the blade carrier 1104 may include a left cap 1114, a right cap 1116, a compression spring 1118, a lift bar 1120, and a wheel 1122. The left cap 1114 and the right cap 1116 may fit together to contain the blade 1106. The left cap 1114 and the right cap 1116 may be mounted together by means of the compression spring 1118, the lift bar 1120, and the wheel 1122, all of which may be mounted to either of the left cap 1114 or the right cap 1116. The compression spring 1118, the lift bar 1120, and the wheel 1122 may rest inside of the left cap 1114 and the right cap 1116. In other embodiments, functional equivalents to the left cap 1114, the right cap 1116, the compression spring 1118, the lift bar 1120, and the wheel 1122 may likewise be understood as being utilized in various alternative embodiments.

In some embodiments, the lift bar 1120 may include an extruded piece of material to hold the blade 1106 in place and may be configured to rotate about a pivot point. In some embodiments, the compression spring 1118 may sit partially in a pocket of either the left cap 1114 or the right cap 1116. In some embodiments, the wheel 1122 may be mounted to a back end of the left cap 1114 and the right cap 1116.

Figure 14:
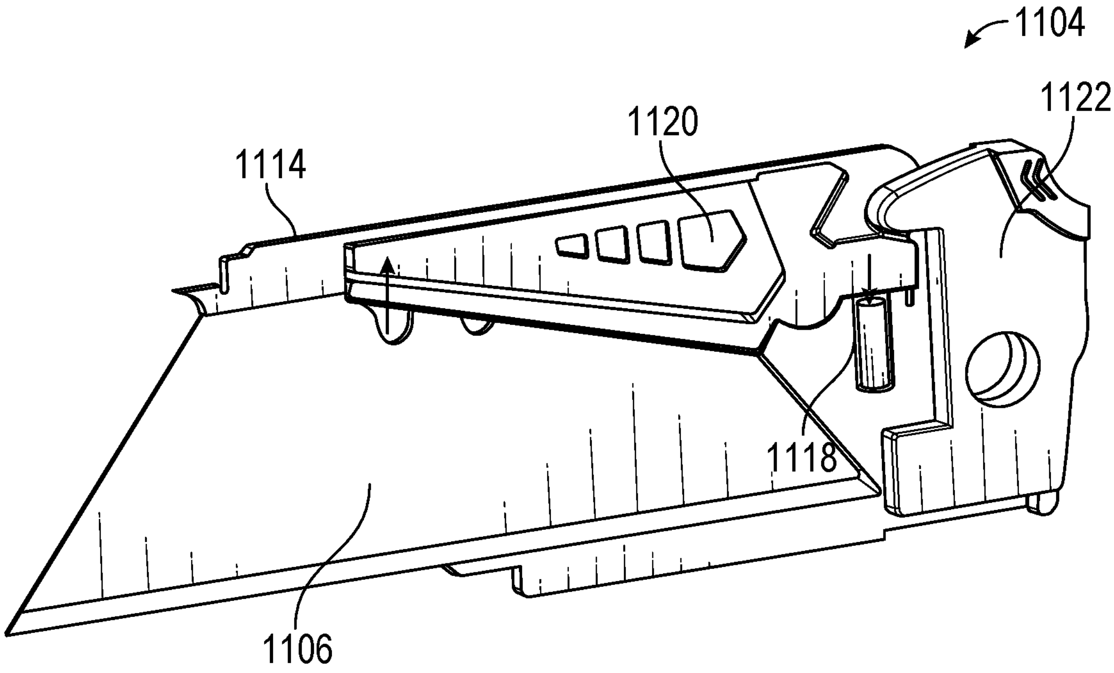
FIG. 14 depicts a side view of the example blade carrier of FIG. 13 in accordance with one or more embodiments of the disclosure.

FIG. 14 depicts a side view of the blade carrier 1104 in accordance with one or more example embodiments of the disclosure. As depicted in FIG. 14, the blade release mechanism 1110 may be used to release the blade 1106. As a user pushes the wheel 1122 towards the left cap 1114 and the right cap 1116, the wheel 1122 turns counter-clockwise to engage with the lift bar 1120. When the wheel 1122 engages with the lift bar 1120, a tab on a first end of the lift bar 1120 may be configured to move downwards to come into contact with the compression spring 1118. When the tab on the first end of the lift bar 1120 comes into contact with the compression spring 1118, the compression spring 1118 may be compressed. This causes the lift bar 1120 to rotate about the pivot point, and a second distal end of the lift bar 1120 may then be forced to move upwards, thus removing contact between the blade 1106 and the lift bar 1120. This enables a user to remove the blade 1106 from the blade carrier 1104.

Although not depicted in FIG. 14, the blade release mechanism 1110 may be used to re-engage the blade 1106. As a user releases all contact with the wheel 1122, the compression spring 1118 may no longer be in compression and may expand. This expansion of the compression spring 1118 then forces a first end of the lift bar 1120 to move upwards. The lift bar 1120 then rotates about the pivot point, and a second distal end of the lift bar 1120 is forced downwards until the lift bar 1120 is in contact with the blade 1106. At this point, if the blade 1106 is disposed within the blade carrier 1104, the blade 1106 will be secured by the lift bar 1120.

In various embodiments, the left cap 1114, the right cap 1116, the lift bar 1120, and the wheel 1122 may be formed from cast aluminum or zinc or powdered metal stainless components. In some embodiments, the lift bar 1120 may be made of stainless steel sheet metal or an engineering plastic such as ABS, polypropylene, or any other strong and/or durable grade of plastic. In some embodiments, the compression spring 1118 may be made of either stainless steel or a plated music wire grade of steel.

Figure 15:
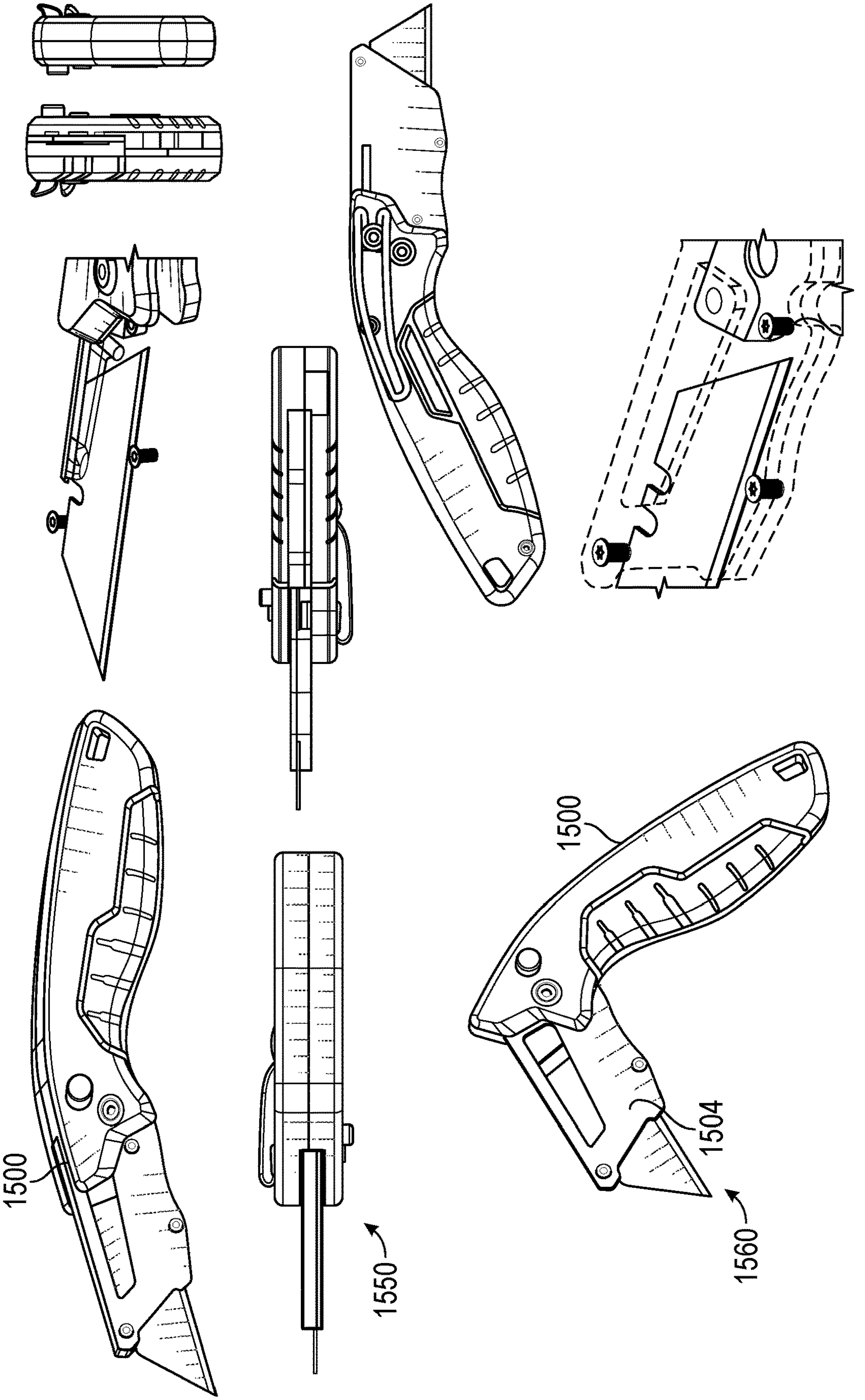
FIG. 15 depicts an example process for removing a knife blade from an example folding knife in accordance with one or more embodiments of the disclosure.
Figure 15:
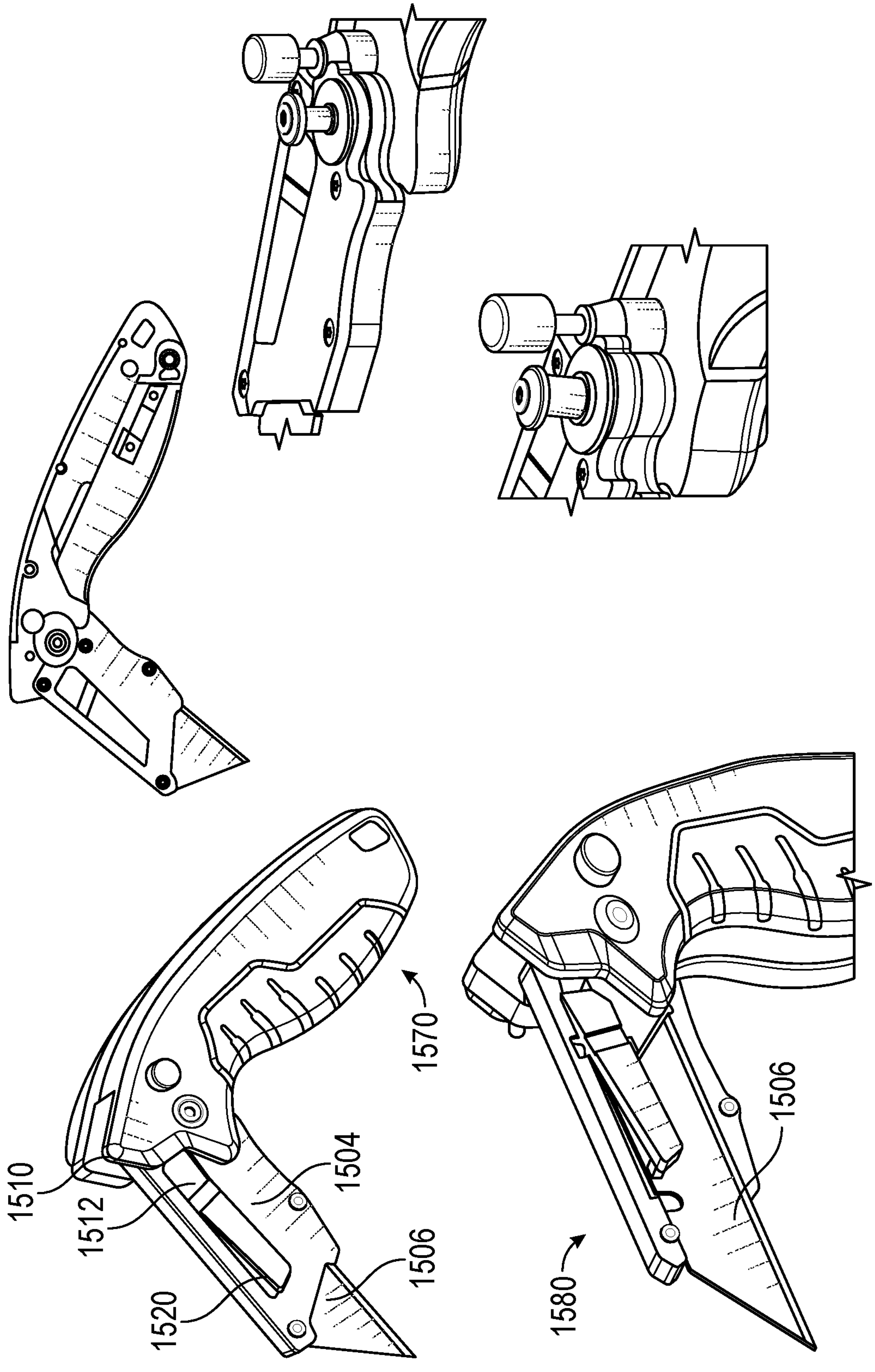

FIG. 15 depicts an example process for removing a knife blade 1506 from an example folding knife 1500 in accordance with one or more embodiments of the disclosure. At initial step 1550, the folding knife 1500 may be disposed in a cutting position.

At step 1560, the folding knife 1500 may be rotated into a blade release position. In some embodiments, a blade carrier 1504 of the folding knife may be rotated 45 degrees.

At step 1570, a button 1512 on the blade carrier 1504 may be pushed. When the button 1512 is pushed, the button 1512 comes into contact with a first end of a lift bar 1520, pushing the first end of the lift bar 1520 towards the blade carrier 1504. The lift bar 1520 is caused to rotate about a pivot point, thus resulting in a second distal end of the lift bar 1520 being moved away from the blade 1506.

In some embodiments, the button 1512 may be a portion of the lift bar 1520. In some embodiments, the portion of the lift bar 1520 that may be depressible may be of a different color than the rest of the lift bar 1520 so as to enable a user to quickly notice the portion of the lift bar 1520 that is depressible. In other embodiments, a portion of the blade release mechanism 1510 that may be pushed or depressed to cause the release of the blade 1506 may be of a different color than the rest of the blade release mechanism 1510 so as to enable a user to quickly detect the correct button for blade release.

At step 1580, the blade 1506 may be released.

Figure 16:
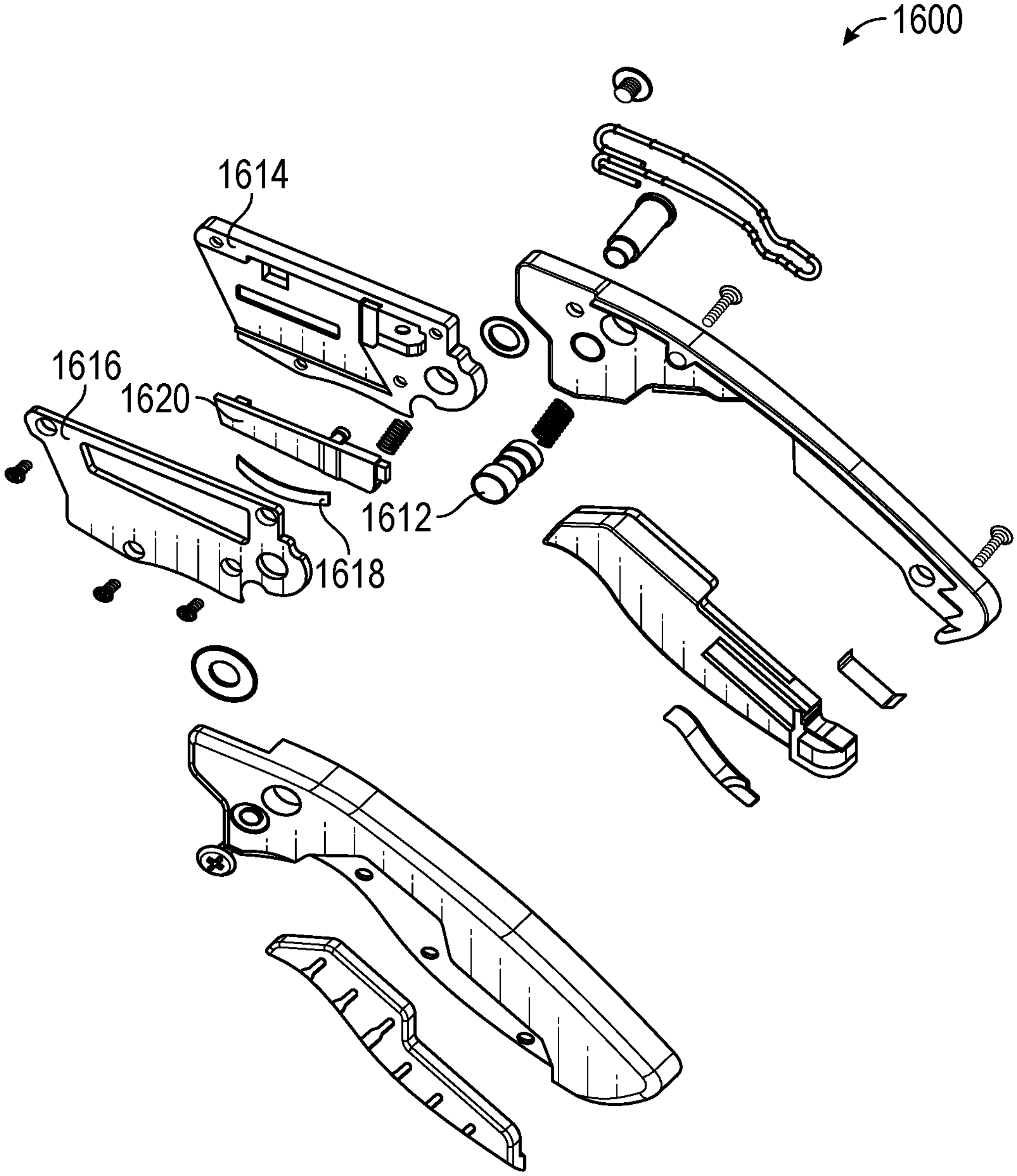
FIG. 16 depicts an exploded view of an example folding knife in accordance with one or more embodiments of the disclosure.

FIG. 16 depicts an exploded view of an example folding knife 1600 in accordance with one or more embodiments of the disclosure. An example folding knife 1600 may include a bottom casting, a bottom grip, a top casting, a top grip, a pivot, a push button 1612, a bottom blade housing 1614, a top blade housing 1616, a lever 1620, a holder screw, a first flat washer, a second flat washer, a leaf spring 1618, a holder spring, a wire belt clip, a case screw, a door spring plate, a button spring, a pivot screw, a spring plate, and a belt clip screw.

Figure 17:
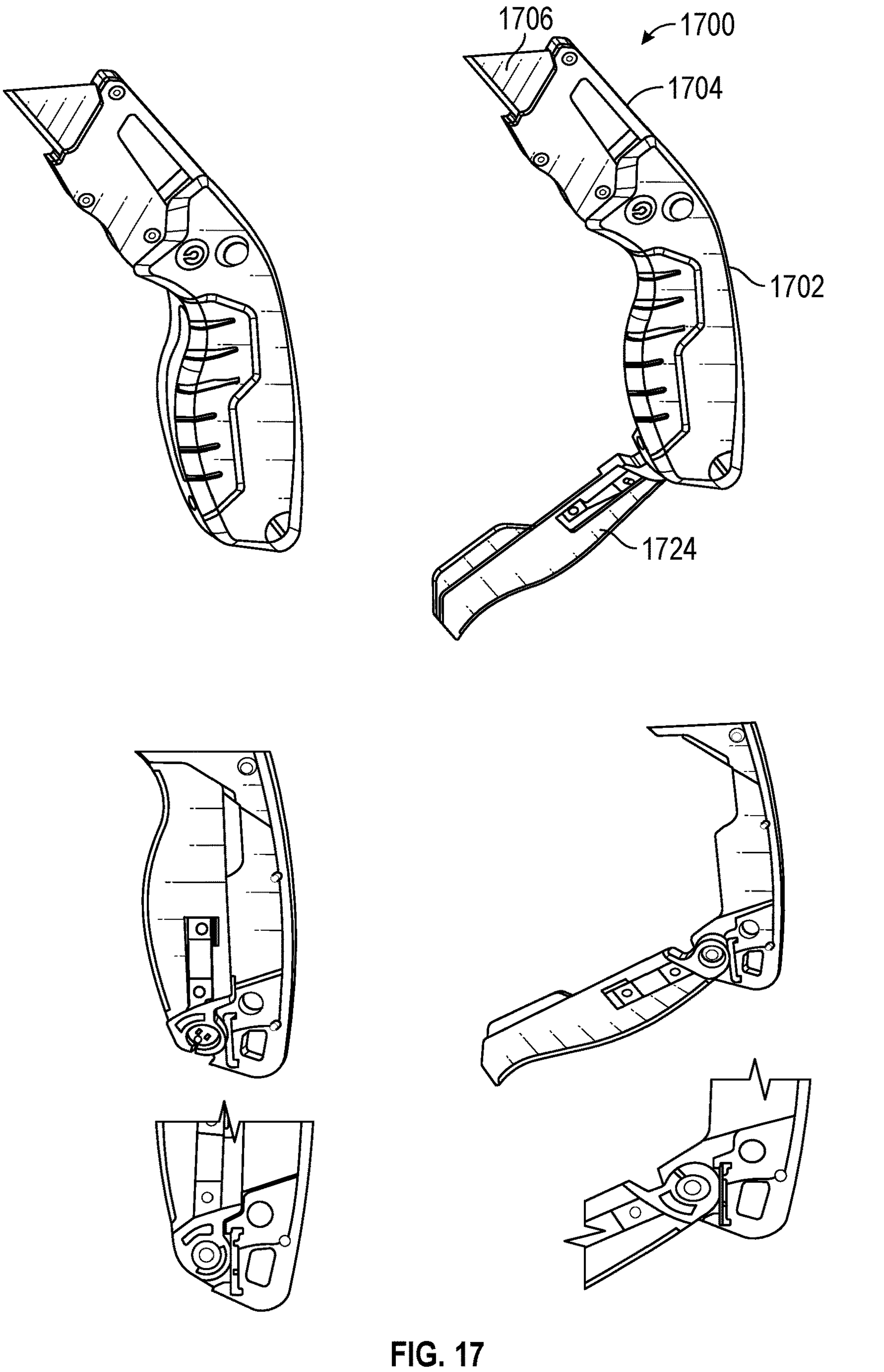
FIG. 17 depicts an example process for storing a knife blade in a blade storage mechanism of an example folding knife in accordance with one or more embodiments of the disclosure.

FIG. 17 depicts an example process for storing a knife blade 1706 in a blade storage mechanism 1724 of an example folding knife 1700 in accordance with one or more embodiments of the disclosure. In some embodiments, a handle 1702 of the folding knife 1700 may further include a foldable blade storage mechanism 1724 that may be rotatable about a first end of the handle 1702. As depicted in FIG. 17, the foldable blade storage mechanism 1724 may be configured to rotate about a pivot point at the first end of the handle 1702. The blade storage mechanism 1724 may be in an open position if it has been rotated out of the handle 1702. The blade storage mechanism 1724 may be in a closed position if it has been rotated back in to the handle 1702. The blade storage mechanism 1724 may thus be sized and shaped to fit into the handle 1702 if a portion of the handle 1702 has been hollowed out. The blade storage mechanism 1724 may further be sized and shaped to store the knife blade 1706, and may include a slot or a pocket for storing the knife blade 1706. The blade storage mechanism 1724 thus provides a convenient solution for storing the knife blade 1706 when the knife blade 1706 is removed from blade carrier 1704 and for retrieving the knife blade 1706 when a user wishes to load the blade carrier 1704.

Although specific embodiments of the disclosure have been described, numerous other modifications and alternative embodiments are within the scope of the disclosure. For example, any of the functionality described with respect to a particular device or component may be performed by another device or component. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or operations. Thus, such conditional language is not generally intended to imply that features, elements, and/or operations are in any way required for one or more embodiments.

The claimed subject matter is:

1. A knife, comprising:

a handle;

a blade carrier rotatable about the handle, wherein the blade carrier comprises at least a left cap and a right cap;

a blade removably disposed within the blade carrier; and a blade release mechanism disposed within the blade carrier and comprising a wheel, a lift bar, and a spring, wherein a portion of the blade release mechanism is visible only when the blade carrier is rotated by a predetermined angle so that the wheel is accessible and operable to move the lift bar from a first position to a second position to release the blade from the blade carrier.

2. The knife of claim 1, wherein the spring is a compression spring.

3. The knife of claim 1, wherein the handle further comprises a blade storage mechanism configured to have an open position and a closed position.

4. The knife of claim 3, wherein the blade storage mechanism is sized and shaped to store the blade when the blade is removed from the blade carrier.

5. The knife of claim 1, wherein the blade is releasable when the wheel of the blade release mechanism is actuated.

6. The knife of claim 5, wherein at least a portion of the at least one of the lift bar, or the wheel of the blade release mechanism is of a different color than the handle.

7. The device of claim 1, wherein the predetermined angle is 45 degrees with respect to the handle.

8. The device of claim 1, wherein in the second position the lift bar is in contact with the spring.

9. The device of claim 8 wherein in the second position, a first end of the lift bar is positioned higher than an opposing second end of the lift bar in a vertical direction.

10. A device, comprising:

a handle;

a blade carrier rotatable about the handle, further comprising:

a left blade carrier; and a right blade carrier;

a blade release mechanism disposed within the blade carrier, further comprising:

a spring;

a wheel; and a bar; and a blade removably disposed within the blade carrier, wherein the blade is removable from the blade carrier when the blade release mechanism is engaged, wherein a portion of the blade release mechanism is only visible once the blade carrier is rotated to a predetermined angle so that the wheel is accessible and operable to move the bar from a first position to a second position to release the blade from the blade carrier.

11. The device of claim 10, wherein the spring is a compression spring, and wherein the bar is a lift bar.

12. The device of claim 10, wherein the handle further comprises a blade storage mechanism configured to have an open position and a closed position.

13. The device of claim 10, wherein the predetermined angle is 45 degrees with respect to the handle.

14. The device of claim 10, wherein in the second position the bar is in contact with the spring.

15. The device of claim 14 wherein in the second position, a first end of the bar is positioned vertically higher than a second opposing end of the bar.

* * * * *